United States Patent [19]
Aldava et al.

[11] Patent Number: 5,191,615
[45] Date of Patent: Mar. 2, 1993

[54] INTERRELATIONAL AUDIO KINETIC ENTERTAINMENT SYSTEM

[75] Inventors: Michael B. Aldava, Tehachapi; Hazen L. MacIntyre, Woodland Hills, both of Calif.

[73] Assignee: The Drummer Group, Woodland Hills, Calif.

[21] Appl. No.: 466,507

[22] Filed: Jan. 17, 1990

[51] Int. Cl.$^5$ .................. H04H 5/00; H04H 7/04; A63H 3/28

[52] U.S. Cl. ........................... 381/3; 358/144; 434/308; 446/301

[58] Field of Search ................ 434/308; 446/301, 298, 446/300; 358/142, 143, 144; 381/2, 3, 4, 118, 124

[56] References Cited

U.S. PATENT DOCUMENTS

| | | | |
|---|---|---|---|
| 3,900,887 | 8/1975 | Soga et al. | 360/18 |
| 4,807,031 | 2/1989 | Broughton et al. | 358/142 |
| 4,839,743 | 6/1989 | Best et al. | 358/310 |
| 4,840,602 | 6/1989 | Rose. | |
| 4,846,693 | 7/1989 | Baer | 434/308 |
| 4,855,827 | 8/1989 | Best | 358/143 |

FOREIGN PATENT DOCUMENTS

0248115 12/1987 European Pat. Off.
WO8707522 12/1987 PCT Int'l Appl. .

Primary Examiner—Forester W. Isen
Attorney, Agent, or Firm—Nemschoff & Supnik

[57] ABSTRACT

Movable and audible toys and other animated devices spaced apart from a television screen are provided with program synchronized audio and control data to interact with the program viewer in relationship to the television program. A sampling keyboard-based encoder for kinetic device actuating signals is coupled via an audio mixer to an audiovisual programming source and television transmitter carrying an audio based kinetic and audio signal complex. At a remote location, coded audio and kinetic device signals along with audiovisual programming is received and the audiovisual programming content is displayed for viewing and listening. Stereo soundband based program audio signals are decoded and separated from the stereo sound band based device audio and kinetic signals. The device audio and kinetic signals are retransmitted to a spaced apart toy causing the device to be audible and move in synchronization with the spaced apart audiovisual programming. A single band low powered FM transmitter carries the audio kinetic signal complex in proximity yet spaced apart from a receiver coupled to an audio cassette configured magnetic head transducer disposed in the kinetic device to communicate audio and kinetic information to a device speaker and motors to cause the device to move and be audible.

42 Claims, 10 Drawing Sheets

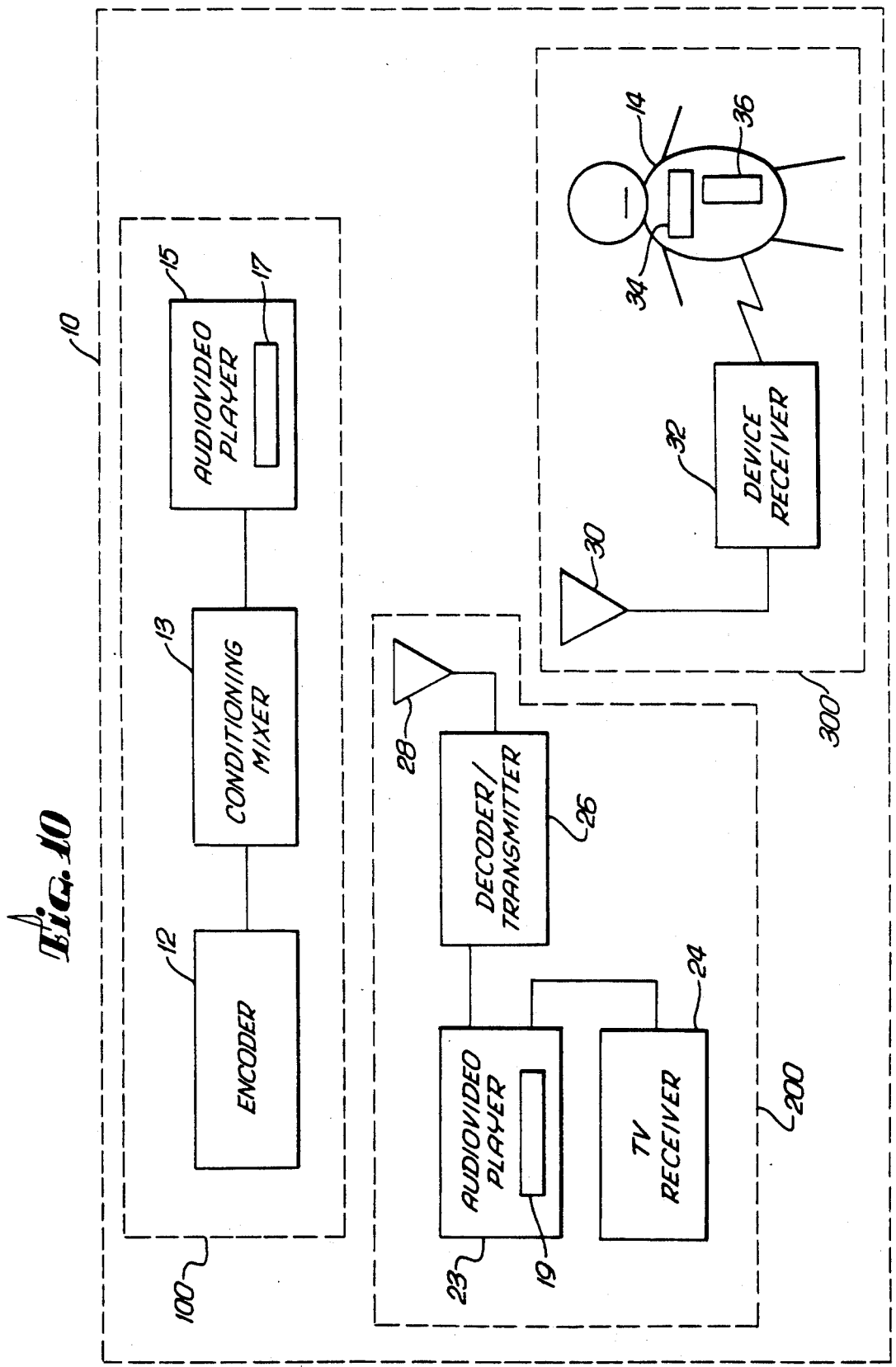

INTERRELATIONAL AUDIO KINETIC ENTERTAINMENT SYSTEM

BACKGROUND OF THE INVENTION

1. Field of the Invention

This invention pertains to entertainment systems in which audiovisual programming is associated with remote movable devices located away from a primary audiovisual display. In particular, the invention pertains to programming systems and receiving systems for causing audible sounds and movements of articulatable toys and dolls in synchronization with audiovisual programming.

2. Description of the Prior Art

Various interactive devices have been proposed in which the viewer of a television broadcast or video cassette recorder program is able to interact with the programming to modify or alter the manner in which the programming is completed. Other interactive arrangements have proposed some communication with toy dolls, vehicles or other devices. Some of these devices may permit the viewer to see similar movements of the device and the television screen, but may limit the interest of the viewer by relating the viewer only to the programming and the device simply as a three dimensional extension of the existing on air or recorded programming. Certain proposed systems use the video blanking interval to communicate sounds and kinetic movement. Those which have used video bands for transmitting sound or motion to a toy are limited to time shifted reactions of toys, the programming preventing real time simultaneous reactions of toys while actions are occurring on screen. Thus sequencing is required, making it difficult to achieve the original qualities in complete synchronization with the normal program.

It would be desirable to enhance the interaction and interreactions with the viewer by permitting programming which creates the appearance of another live character able to interreact with both the viewer and the programming appearing on the television screen. In particular, it would be desirable to be able to allow a live character or device to carry essentially all the original qualities of the performance integrity of the actor and voice specialists at a remote location in complete synchronization with the normal program. Those features would include maintaining the subtle though essential attributes of tonal inflection, volume, accent, timing, emotion and energy originally intended by the author of the programming and portrayed by the actor.

Moreover, it would be desirable to have a system and method for creating and generating kinetic device control data signals in synchronization with new and existing programming.

There are presently in existence a large number of dolls with built in cassette players and it would be advantageous to be able to combine the programming proposed by this invention with the existing talking and actuatable dolls having cassette players which presently are available to the public.

SUMMARY OF THE INVENTION

A system is described in which a device audio and a kinetic signal are coded for synchronization with audiovisual programming. The audio visual programming can be existing programming or can be specially created for use with the system. The audio and kinetic signals are combined and carried along with the audio portion of the audiovisual signal to a transmitter, which can either be a broadcast system sent out on electromagnetic waves, or a hardwired closed circuit system. A local transceiver receiving end is provided in which the signals (which include the additional audio and kinetic signals) are received and decoded. A secondary transmitter couples the device audio and kinetic signals to the device or doll. The device audio signal drives an audio transducer or speaker in the kinetic device or toy, and the kinetic signal drives the moving parts of the kinetic device or toy. The programming is such that the toy becomes movable and audible in real time simultaneously and in synchronization with the programming appearing nearby but spaced apart from the face of the television or video screen. The audio and kinetic signal can be provided simultaneously in real time in synchronization, yet separate from the audio portion of the audiovisual display.

In some configurations, the audio-kinetic signal complex is carried by a single-band low-powered FM transceiver system to the kinetic device, while in other configurations, separate remote-control frequency transceiver systems are used to communicate the audio and kinetic information to the kinetic device.

Other examples describe an audio cassette configured modular adapter for receiving the audio-kinetic signal complex and communicating it to the device. This permits the use of the system with a substantial existing base of articulatable toys.

Examples of programming systems associated at the front en of the entertainment system include a MIDI sequencer and a signal mixing and conditioning console for establishing motion control codes and audio signals for the articulatable device. A sampling and sequencing keyboard provides the input signals to the kinetic code modulator. Kinetic codes are used to select control paths, direction and duration of device movements.

While means for generating separate audio and kinetic signals in some examples may appear at a broadcast transmitter, in other examples, the audio and kinetic signal generating means may appear at a more localized source of programming. For example, the programming may be in the form of a consumer video cassette or laser disc or other audiovisual programs, rather than being remotely broadcast into the consumer's home.

BRIEF DESCRIPTION OF THE DRAWINGS

The nature of the invention described herein may be best understood and appreciated by the following description taken in connection with the accompanying drawings in which:

FIG. 10 is a modified schematic block diagram of the interrelational audio kinetic entertainment system depicted in FIG. 1 in accordance with this invention.

DETAILED DESCRIPTION

Figure 1:
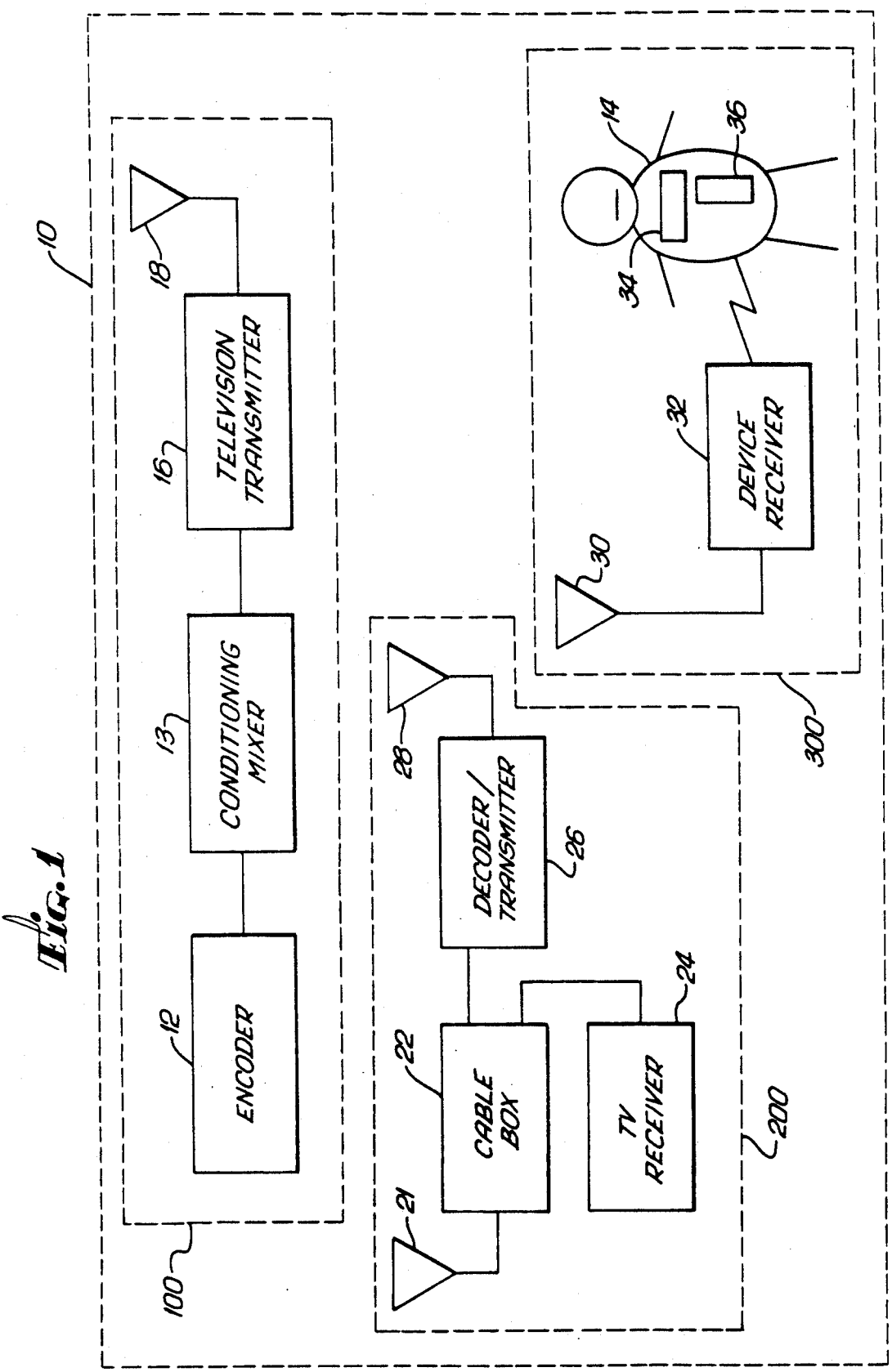
FIG. 1 is a schematic block diagram of an interrelational system in accordance with this invention.

With particular reference to FIG. 1 and FIG. 10, an interrelational audio-kinetic entertainment system 10 generally comprises a front end 100 which includes a kinetic code generator or encoder 12 for generating kinetic codes in synchronization with programming and a conditioning mixer 13 coupled to the encoder 12. The kinetic code generator 12 creates signals equivalent to kinetic codes and audio signals for a kinetic device 14 such as a doll along with the existing or specially created programming signals and are communicated through a television transmitter 16 or other distribution system. The television transmitter 16 is an ordinary television transmission system and enhanced programming provided by the system 10 appears essentially transparent to the transmitter 16. The programming may be existing entertainment programming or specially created programming for the system 10. Thus, the existing theatrical or television programming may be enhanced by adding additional material in the form of program synchronized control data for an animated or kinetic device or doll, and a separate synchronized audio which can be played by the kinetic device 14 or doll.

The conditioning mixer system 13 combines the device audio and kinetic signals so that they are combined with the ordinary stereo audio signals for transmission by the television transmitter 16. The kinetic and audio signals for the kinetic device 14 are later separated by use of the second audio signal commonly now used for stereo television broadcasts.

The conditioning mixer 13 is coupled to the television transmitter 16 which then broadcasts signals which carry both the normal television audio and video signals, with that of the second audio channel containing both time varying kinetic movement information and an audio signal for the kinetic device 14.

The transmitter 16 is coupled to a broadcast antenna 18 which broadcasts the composite signals in the normal manner in which television signals are broadcast. At remote locations in the manner that television is normally received, a local transmitter section 200 receives the television signals from the broadcast antenna 18, separates the kinetic device audio and kinetic signals and rebroadcasts the separated kinetic device audio and kinetic information to be applied to the kinetic device 14. The local transmitter section 200 comprises a television antenna 21 to communicate the broadcast signals from the front end. The receiving antenna 21 is an ordinary television antenna for receiving ordinary television broadcast signals or as generally shown in FIG. 1, the ordinary cable inlet or other consumer television delivery system. Thus, the antenna 18, 21 are used primarily to diagrammatically and generally depict some form of broadcast or transmission, whether by way of electromagnetic radiation, cable or other means. The cable signals from the antenna 21 are fed to a cable box 22. Alternatively, the signals may be fed to a cable converter, cable decoder, satellite receiver or "cable ready" input of a video cassette recorder (VCR). The signals are also applied to a television receiver 24 which is coupled to the cable box 22 to receive the signals in parallel with the cable box 22.

Both the television transmitter, broadcast antenna, cable box 22 and television receiver 24 are the same as are commonly in use. A decoder/transmitter 26 coupled to the cable box 22/TV receiver 24 separates the second audio signal containing both the kinetic signal information and the audio signal for the doll 34. That information is then broadcast via a local antenna 28 coupled to the decoder transmitter 26. A stereo television frequency demodulator by itself or more commonly as part of a television receiver 24 or cable decoder 22 may provide the two channel stereo signals for further signal processing of device audio and kinetic signals.

If the stereo kinetic signal is broadcast directly through the second audio channel of a television broadcast station, the kinetic and device audio information can be received directly without the necessity of the cable box 22. As shown in FIG. 10, the audio and kinetic signal may exist within the stereo audio tracks of a video cassette or a laser disk or analogous device. The front end 100 may terminate with some form of audiovideo recorder 15 such as a video cassette recorder or video laser recording system in which a master recording 17 is created. A consumer copy of the media 21 on which the programming is recorded is played by an audiovideo player 23. In such event, rather than remote television transmission, the programming containing the kinetic and audio device control data is located as part of the stereo audio signals of the media generated sound, in which case the audio output of the laser disk player or VCR or other audiovideo player 23 is coupled directly to the decoder/transmitter 26.

A receiving section 300 is located in proximate yet spaced apart relationship to the local transmitter section 200 and includes a local receiving antenna 30 coupled to a device receiver 32. The receiving section provides for receiving the device audio and kinetic signals and includes the kinetic device 14 itself. The local receiving antenna 30 receives the kinetic and audio signals intended for the doll 14. The receiver 32 demodulates the signals for the doll, and applies the audio signal to a speaker 34 within the doll or kinetic device 14 for emitting sounds, voice or music, and applies the kinetic signals to a decoder driver 36 for causing various movements of the kinetic device 14. Depending on the particular device used, the eyes, mouth, arms or legs could move to the extent articulatable, in relationship to the audiovisual programming. Since the kinetic and audio channels are separate from the audio channel of the television, it is possible for the doll to emit sounds or speak simultaneously, but with different words and in real time while the programming visible on the television screen and audible from the television speaker is speaking or saying something different. The result is that the toy 34 can appear to be a completely autonomous character which is able to interrelate with either the television programming or the viewer.

Use of inband audio transmission of a typical television broadcast system allows a substantially more complex audio program to be linked to the normal broadcast than with video modulation schemes. This provides the ability to allow simultaneous second audio programs along with the normal programs, so that dialogue can occur without the burden of sequencing.

Figure 2:
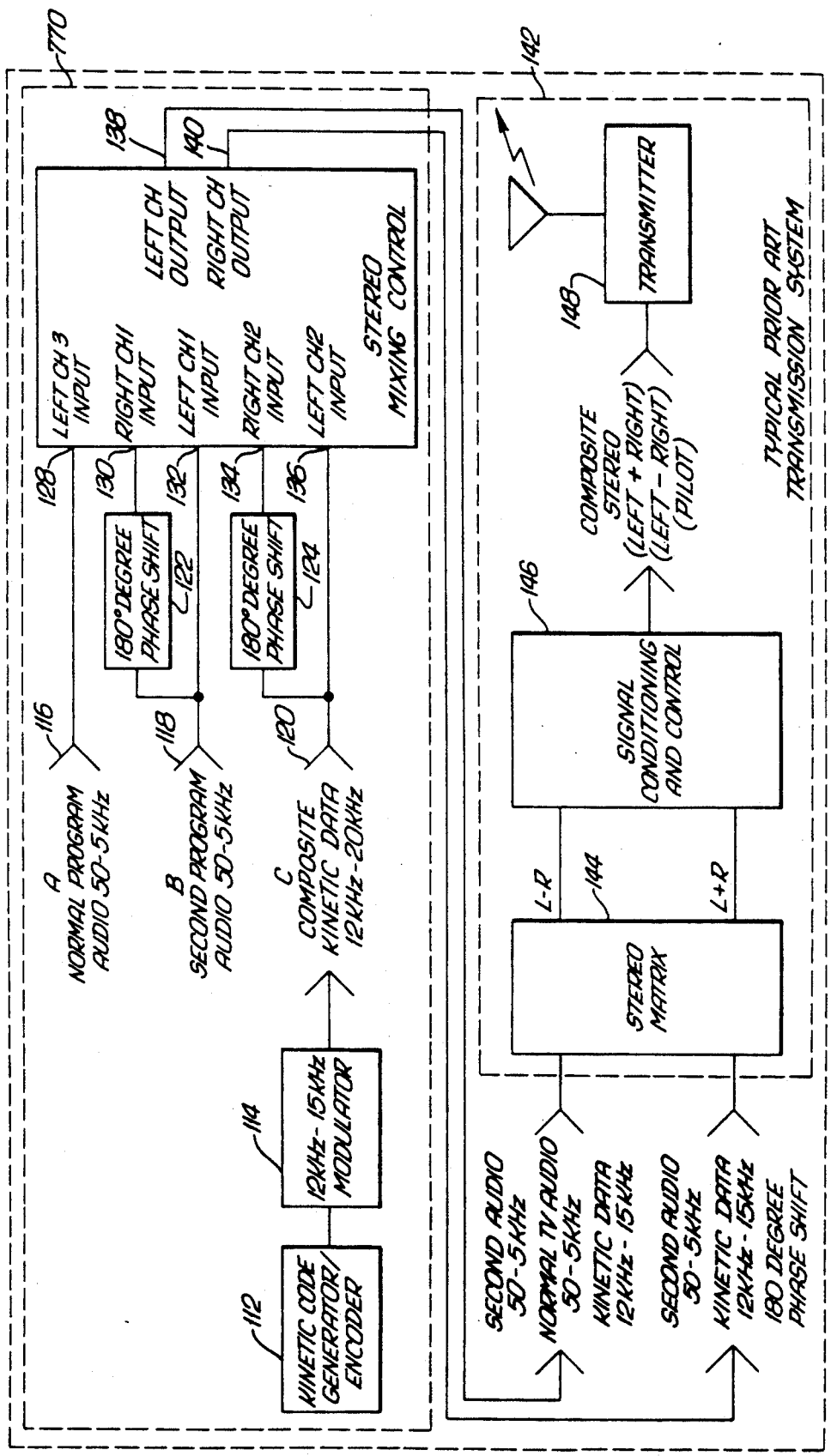
FIG. 2 is a schematic block diagram of a front end of an interrelational audio kinetic entertainment system depicted in FIG. 1 in accordance with this invention.

With particular reference to FIGS. 1 and 2, a front end 100 of the system is shown having a kinetic code generator/encoder 112. The kinetic codes are designed to cause movement of the kinetic device 14 at a remote location. The encoder 112 may include the standard MIDI style sequencer which is used in connection with music synthesizers for generating codes corresponding to kinetic movements of the doll 14.

A modulator 114 is coupled to the encoder 12 and provides a carrier signal for the coded signal provided by the encoder. Typically, the carrier frequency is in the 12 KHz to 20 KHz range.

As is the existing situation in the ordinary television broadcast transmitter 16, the transmitter generates a signal with a video component and an audio component. The audio component may be split into separate signals. Currently, the separate signals may be used to carry separate right and left stereo channels in some instances. In accordance with the invention, the second channel is used to carry two separate components. One component is the kinetic signal, which is ultimately communicated to an articulatable doll 14. The second component is a separate audio signal which is also communicated to the doll 14 so that the toy can talk or emits sounds entirely separate from the programming which appears and is heard at the television receiver 24. Yet both the kinetic movements of the device 14 and the audio sounds emanating from the toy are synchronized, separately movable, in separate real time relationship to the programming appearing and emanating from the television receiver 24.

Shown in FIG. 2 is the channel A source 116, the channel B source 118 and the channel C composite signal source 120. The channel A source 116 provides the normal program audio signal in the range of 50 Hz to 5 Khz. The channel B source 118 provides the audio program for use particularly in accordance with this invention in the audio frequency range of 50 Hz. to 3 Khz. This audio range is narrow enough to conserve 7-10 Khz of the available bandwidth for additional data, yet the fidelity is still adequate for reasonable commercial listening purposes. It is this channel B that carries the sound signal that ultimately is audible from the remotely located doll or device 14. The channel B source generates sounds which are synchronized with the programming and the audio of the channel A and of the video programming.

The channel C composite signal 120 receives a modulated signal from the modulator 114. That signal carrying the kinetic data is then available from the composite signal 120.

A first phase shifter 122 is coupled to the second program audio to provide an equivalent signal 180° out of phase with the second program audio signal. A second phase shifter 124 is coupled to the composite kinetic data source 120 to provide an equivalent signal 180° out of phase with the composite kinetic data signal.

The stereo mixing control 126 provides separated left and right signals. The left signal represents a composite of both the device audio and kinetic signals and the normal programming audio signal. The right signal represents a composite of both the device audio and kinetic signals 180° phase shifted. The purpose of the stereo mixing control 126 is to blend and balance the signals in the left and right channels to their respective outputs in a form compatible for direct transmission or tape recording.

The first and second phase shifters 122, 124 along with the mixing control 126 provide a means of phase cancellation of unwanted left channel audio/kinetic information from the right channel normal program which is the result of the following equation:

$(R_{ch}) + (L_{composite}) = (R_{composite}) + (-L_{composite}) = R_{ch}(-L_{kin}) + (-L_{aud}) = (-L_{composite}) = L_{ch}$ where $R_{ch}$ represents the right channel signal, thus, the normal television audio signal, $L_{Kin}$ represents the left channel kinetic signal, $L_{aud}$ represents the left channel audio and represents the device audio signal, $L_{ch}$ represents the left channel which contains the device audio signal and the kinetic signal. $R_{composite}$ represents the original audio signal plus the added kinetic signal and the device audio signal. The $R_{composite}$ is fed through the broadcast station as the right audio channel of a stereo television broadcast signal. $L_{composite}$ represents the kinetic signal and the device audio signal The inverted $L_{composite}$ is fed to the broadcast station as the left audio channel of the stereo television broadcast signal. The minus signs within the parentheses represent phase shifted signals.

The stereo mixing control 126 has an inputs 128 coupled to and responsive to the channel A signal source 116, an input 130 responsive to and coupled to the first phase shifter 122, and an input 132 responsive and coupled to the channel B source 118. In addition, the stereo mixing control also has an input 134 coupled to and responsive to the second phase shifter 124 and an input 136 responsive and coupled to the left channel composite kinetic data generator 120. The resulting original stereo program is made available at the outputs 138, 140 of the stereo mixing control 126 for existing broadcast systems 142 or recording systems. As is well known in the art, the broadcast system 142 includes a stereo matrix 144 for generating signals related to the sum and difference of right and left channel input signals. The output signals of the stereo matrix 144 are applied to signal conditioning and control circuitry 146. The output of the signal conditioning and control circuitry then is applied to the transmitter 148 which broadcasts the audiovisual signals.

Figure 3:
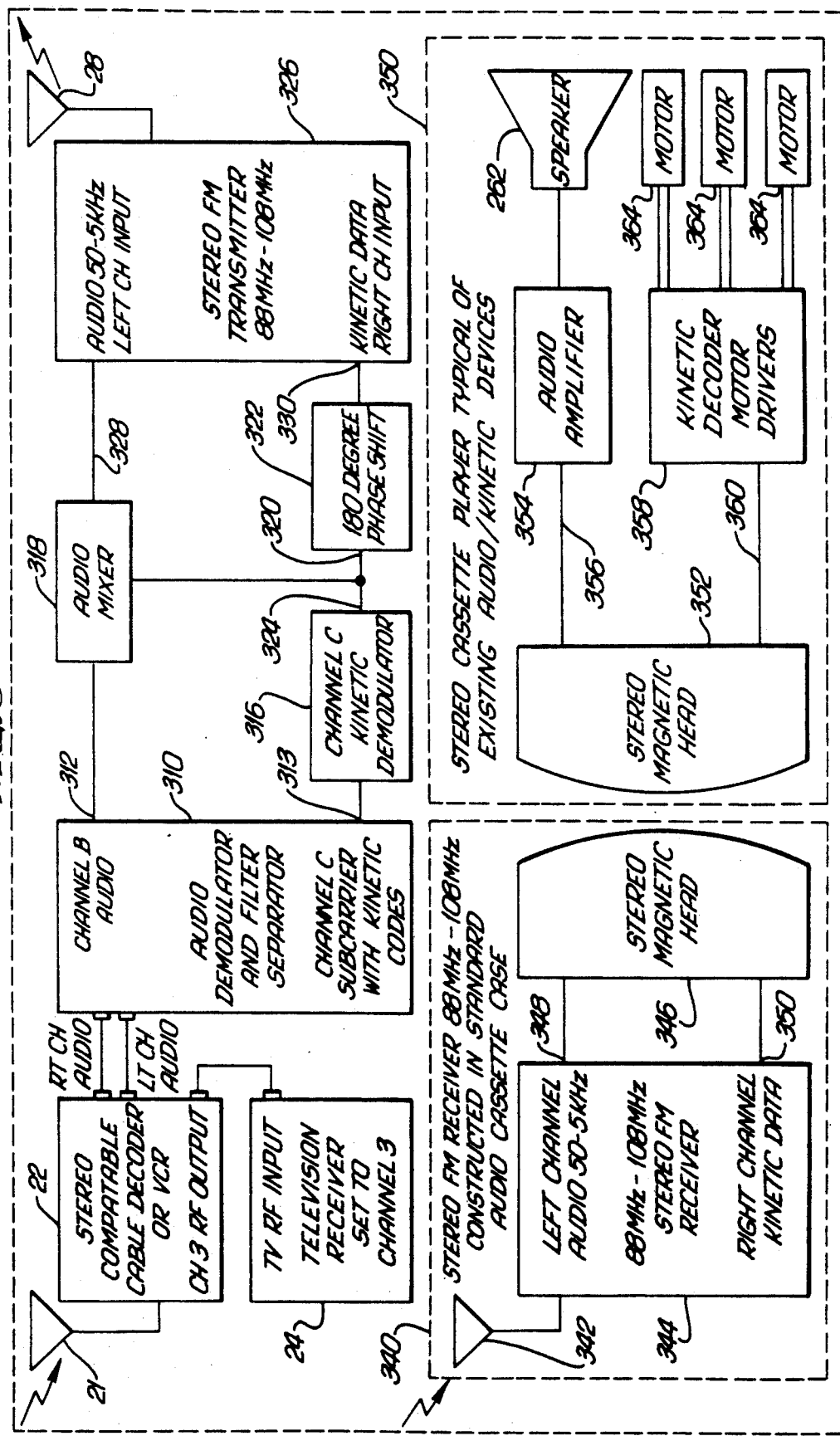
FIG. 3 is a schematic block diagram of the receiving end of an interrelational audio kinetic entertainment system depicted in FIG. 1 in accordance with this invention.

With particular reference to FIG. 3, one example of a receiving end is shown having the antenna 21 coupled to the cable decoder/VCR/MTS stereo decoder 22 and the television receiver 24 which is set to channel 3. The audio left and right signals are then applied to the decoder transmitter 26. The decoder 26 includes an audio demodulator and filter separator 310 to separate the kinetic signals from the device audio signals. The audio demodulator and filter separator separates the channel B audio and channel C kinetic signals as well a channel A normal program audio at outputs 312, 313. The output 312 is applied to an audio mixer 318 and the output 313 is applied to a channel C kinetic demodulator 316. Although the channel A audio is demodulated, it is unused in this system as the television audio has already been made available for use at the television receiver 24.

The output of the channel B audio 312 is applied to the audio mixer 318 which receives a 180° phase shifted signal from out-put 320 of a phase shifter 322. The phase shifter 322 receives a signal from output 324 of the channel C kinetic demodulator 316. A stereo FM stereo transmitter 326 is shown in FIG. 3 which receives at input 328, a channel B composition input of the device audio and 180° phase shifted kinetic data from the audio mixer 318. The audio input is at 50 Hz to 3 Khz. range. The transmitter 326 also receives kinetic data at a right. channel input 330. The stereo FM transmitter 326, includes an IC such as a BA1404 stereo broadcaster integrated circuit of Rohm Corporation of Irvine, Calif., is preferably adjustable along the standard 88 Mhz to 108 Mhz. band and is typically a low power transmitter powered within applicable regulations. Outside of the United States, the frequency and output power range can be suitably adjusted and set at an appropriate power level. The output of the transmitter is transmitted by a local antenna 28.

As shown in FIG. 3, an FM modular cassette receiver 340 is shown in the form of a block diagram. The receiver is housed in a standard audio cassette case. The cassette receiver 344 has an antenna 342, schematically shown and coupled to the receiver 344. The receiver 344 provides an audio signal to a stereo magnetic head 346 through output 348, and a kinetic data signal to the stereo magnetic head 346 through output 350.

The cassette receiver 340 is disposed in engagement with a stereo cassette player 351 which is disposed within the doll or kinetic device 14. The stereo cassette player 351 is typical of existing players in audio/kinetic devices 140. The cassette player 351 has a stereo magnetic head 352 for receiving the signal from the cassette receiver 340. The output of the stereo magnetic head 352 is applied so that one channel of the head 352 is applied to an audio amplifier 354 through lead 356, while the other channel of the head 352 is applied to a kinetic decoder and motor drivers circuit 358 through lead 360. The output of the audio amplifier 354 is applied to a speaker 362, equivalent to the speaker 34 in FIG. 1. The kinetic decoder motor driver circuit 358 is coupled via separate outputs to a plurality of motors 364 which control the movement of various portions of the doll 14.

Figure 4:
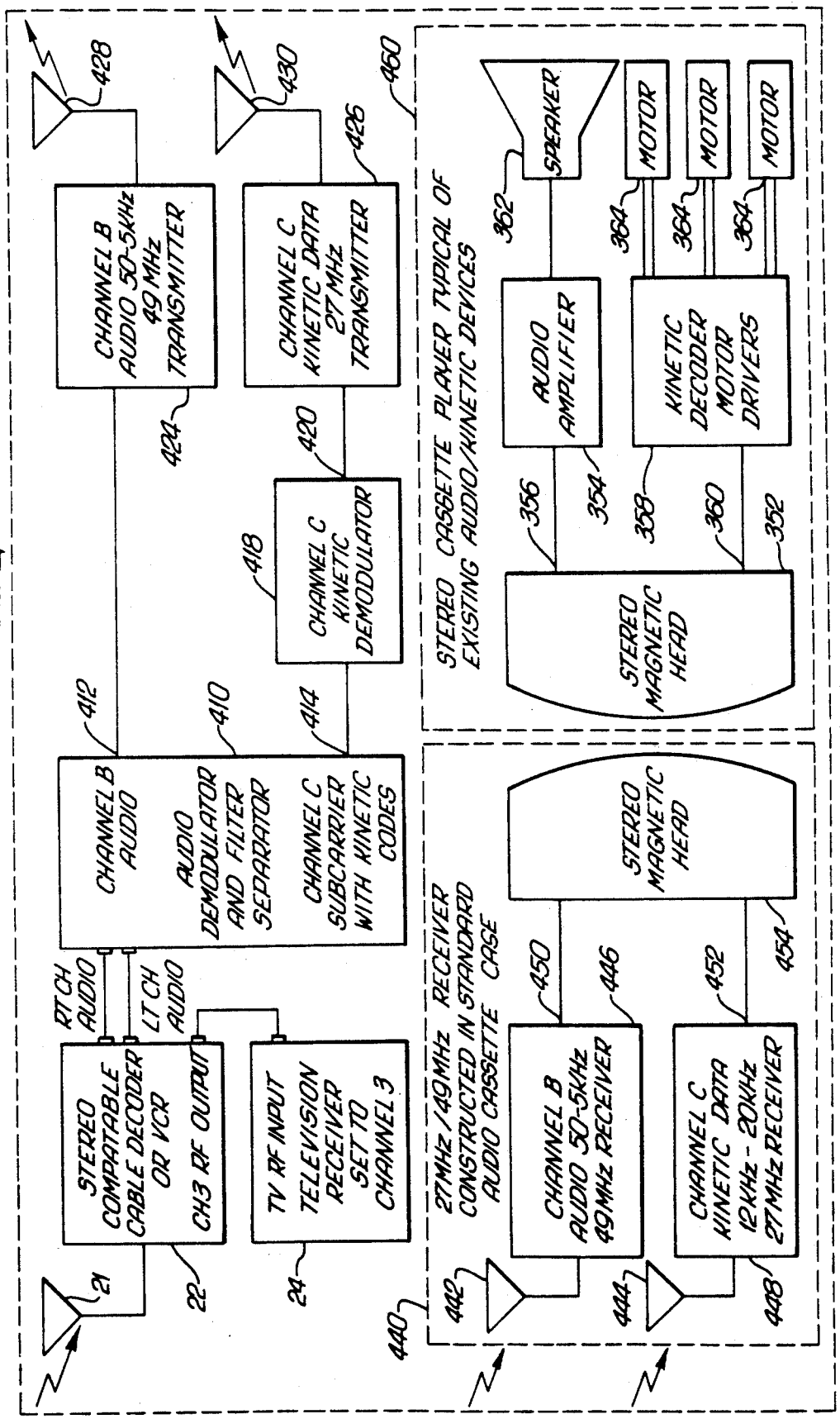
FIG. 4 is a schematic of a different example of a receiving end of an interrelational audio kinetic entertainment system in accordance with this invention.
Figure 5:
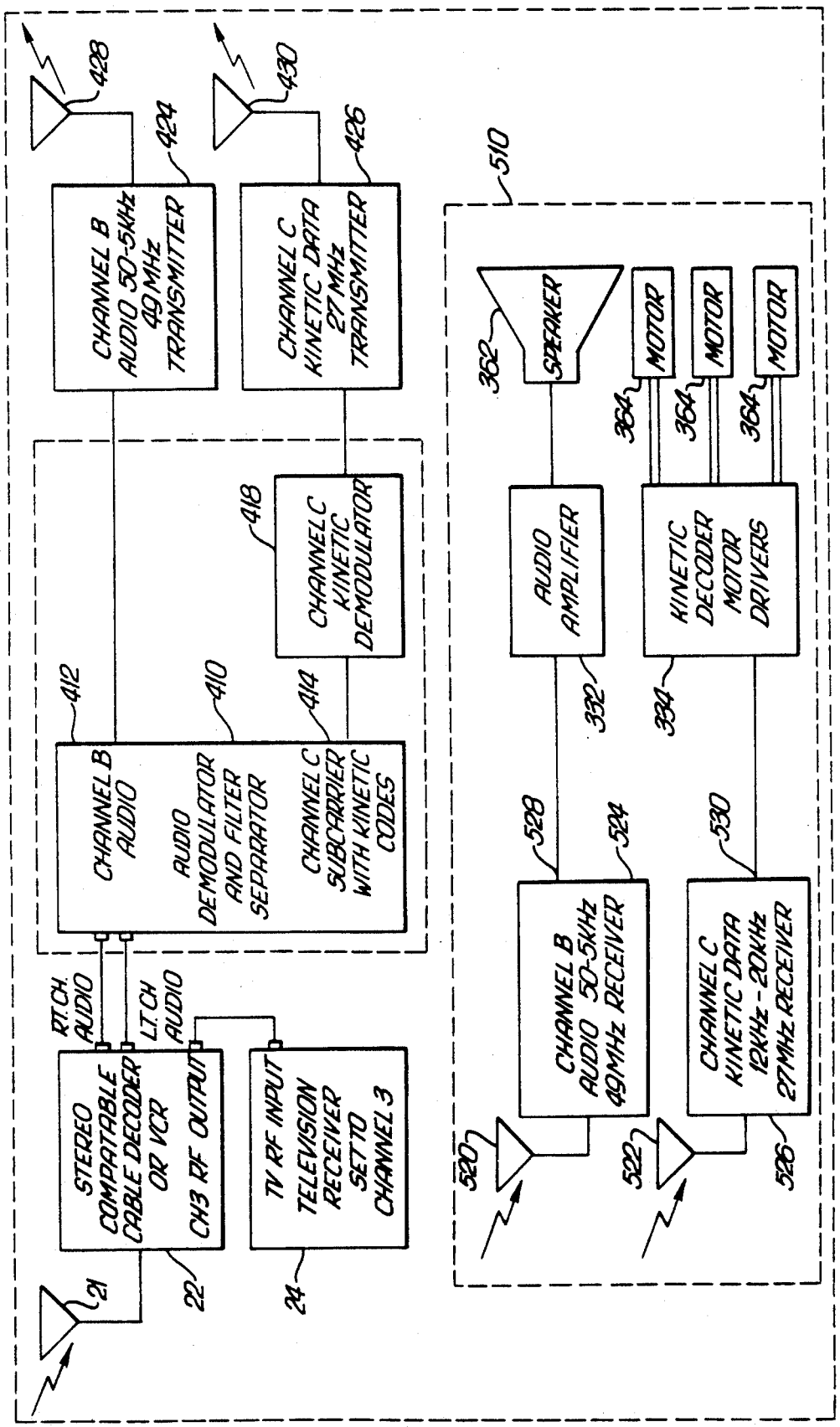
FIG. 5 is a schematic of a still different example of a receiving end of an interrelational audio kinetic entertainment system in accordance with this invention.

Another example of the local transceiver arrangement, essentially blocks 200 and 300 of FIG. 1, is shown in FIG. 4. A channel 3 audio demodulator and filter separator 410 is coupled to the cable decoder/vcr/cable converter 22, and the television receiver 24. The demodulator and filter separator 410 have outputs 412, 414. The demodulator and filter separator 410 demodulates the left channel audio and kinetic carrier which is filter separated to the outputs 412 and 414 respectively. The output 414 is applied to a channel C kinetic demodulator 418. The output 412 is applied to a channel B audio transmitter 424, while the output of the left channel C kinetic demodulator 418 is applied through an output 420 to a channel C kinetic data transmitter 426. The channel B audio transmitter 424 here has a 49 Mhz. carrier signal for the audio in a band range of 50 Hz. to 3 Khz. and is applied to a frequency matched antenna 428. The channel C kinetic data transmitter 426 has a carrier frequency of 27 Mhz. for the kinetic data and is coupled to a frequency matched antenna 430. The frequencies of 49 Mhz. and 27 Mhz. are normal frequencies used in the United States for radio controlled and remote control applications.

A modular receiver 440, then requires separate frequency receivers or receiver circuits with matched antennas. Receiving antennas 442, 444 are shown for receiving the 49 Mhz. and 27 Mhz signals respectively. The antennas 442, 444 are coupled to respective 49 Mhz receiver 446 and 27 Mhz. receiver 448. Each of the receivers 446, 448 have audio preamplifiers. The 49 Mhz. receiver 446 receives the channel B audio in the 50 hz. to 3 Khz range. The 27 Mhz. receiver 448 receives the data. The outputs 450, 452 of the receiver preamplifiers 446, 448 are applied to a stereo magnetic head 454. The matching stereo cassette player 460 used in connection with this example then is the same as shown in FIG. 3.

With particular reference to FIGS. 1, 2, 4 and 5, a different example of the receiver 300 is shown in which the local transceiver system 200 is the same as shown in FIG. 4, and thus, the elements shown are similarly numbered. The receiver 510, however is a receiver that directly receives the left audio channel sound and the kinetic data, without feeding through the modular cassette adapter 440 which is shown in FIG. 4. It is more likely to be utilized on dolls which are not already equipped with a stereo cassette player for existing audio/kinetic dolls.

The receiver 510 has two local antennas 520, 522, each matching their respective 49 Mhz. and 27 Mhz. signals. The antenna 520 is coupled to a 49 Mhz. channel B audio receiver 524 and the antenna 522 is coupled to a 27 Mhz. channel C kinetic data receiver 526. An output 528 of the channel B audio receiver 524 couples the receiver 524 to an audio amplifier 532, and an output 530 of the channel C kinetic data receiver 526 couples the receiver to a kinetic decoder motor driver 334. The kinetic decoder motor driver 334 is so designed as to be compatible with existing device mechanical designs as well as incorporating additional control outputs for expansion of device capabilities as in FIG. 3. Outputs from the kinetic decoder motor driver are then coupled to motors 364 which cause the doll 14 to move synchronized with the programming.

Figure 6:
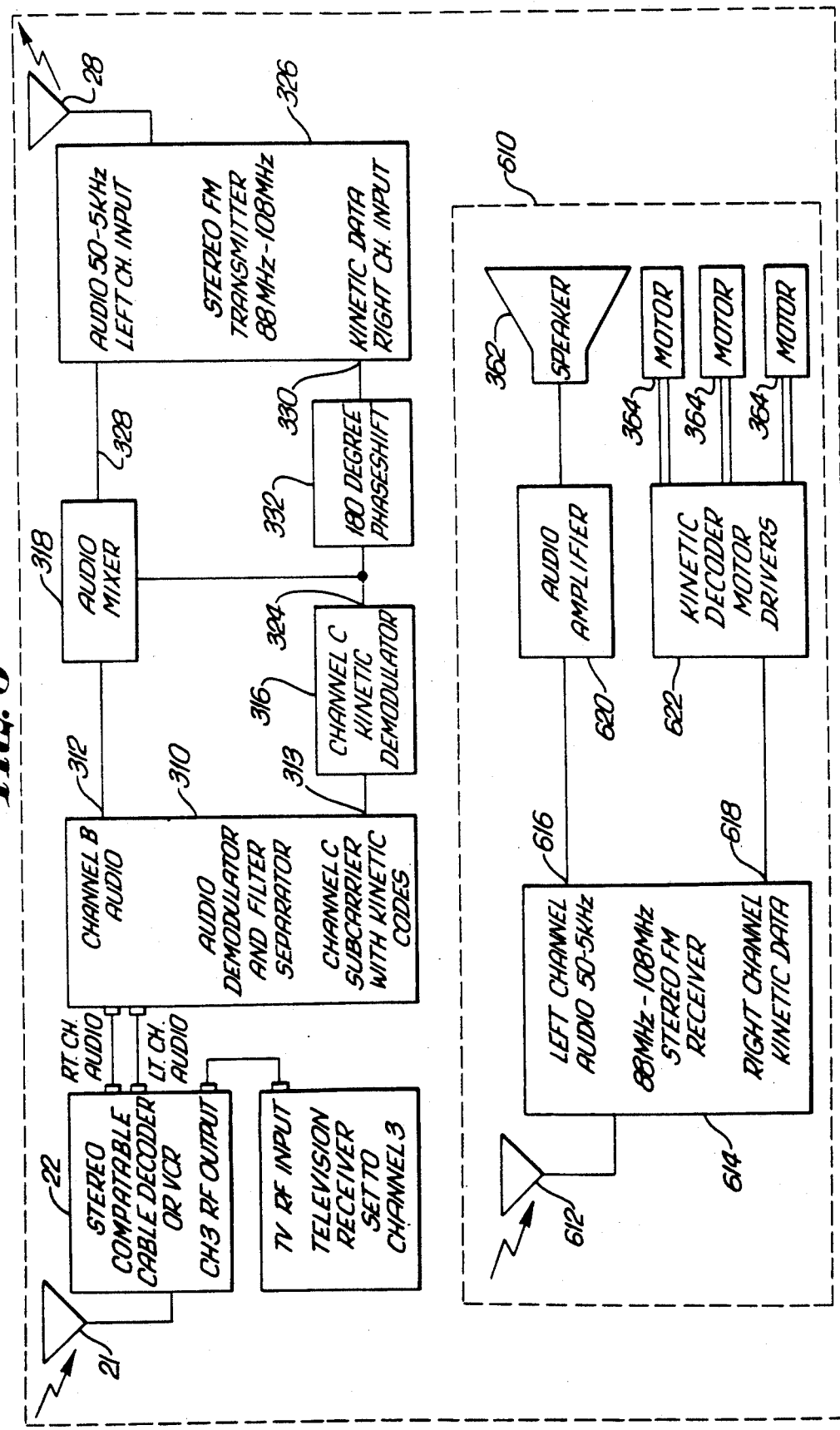
FIG. 6 is a schematic of an still different example of a interrelational audio kinetic entertainment system in accordance with this invention.

With particular reference to FIG. 6, a different example of the receiver 300 is shown in which the local transceiver system 200 is the same as shown in FIG. 3, and thus, the elements shown are similarly numbered. Thus the transceiver in its transmission section uses a stereo FM transmitter broadcasting at a frequency in the normal FM band of 88–108 Mhz.

The receiver 610, however is a receiver that directly receives the audio left channel sound and the right channel data, without feeding through a modular cassette adapter. A receiving antenna 612 is coupled to a stereo FM receiver 614. The output of the receiver 614 has two channels, the left channel having an output 616 and a right channel having an output 618. The audio amplifier 620 is coupled to the output 616 of the receiver, and the output of the kinetic decoder and motor drivers 622 are coupled to the motors 364 of the doll 14.

Figure 7:
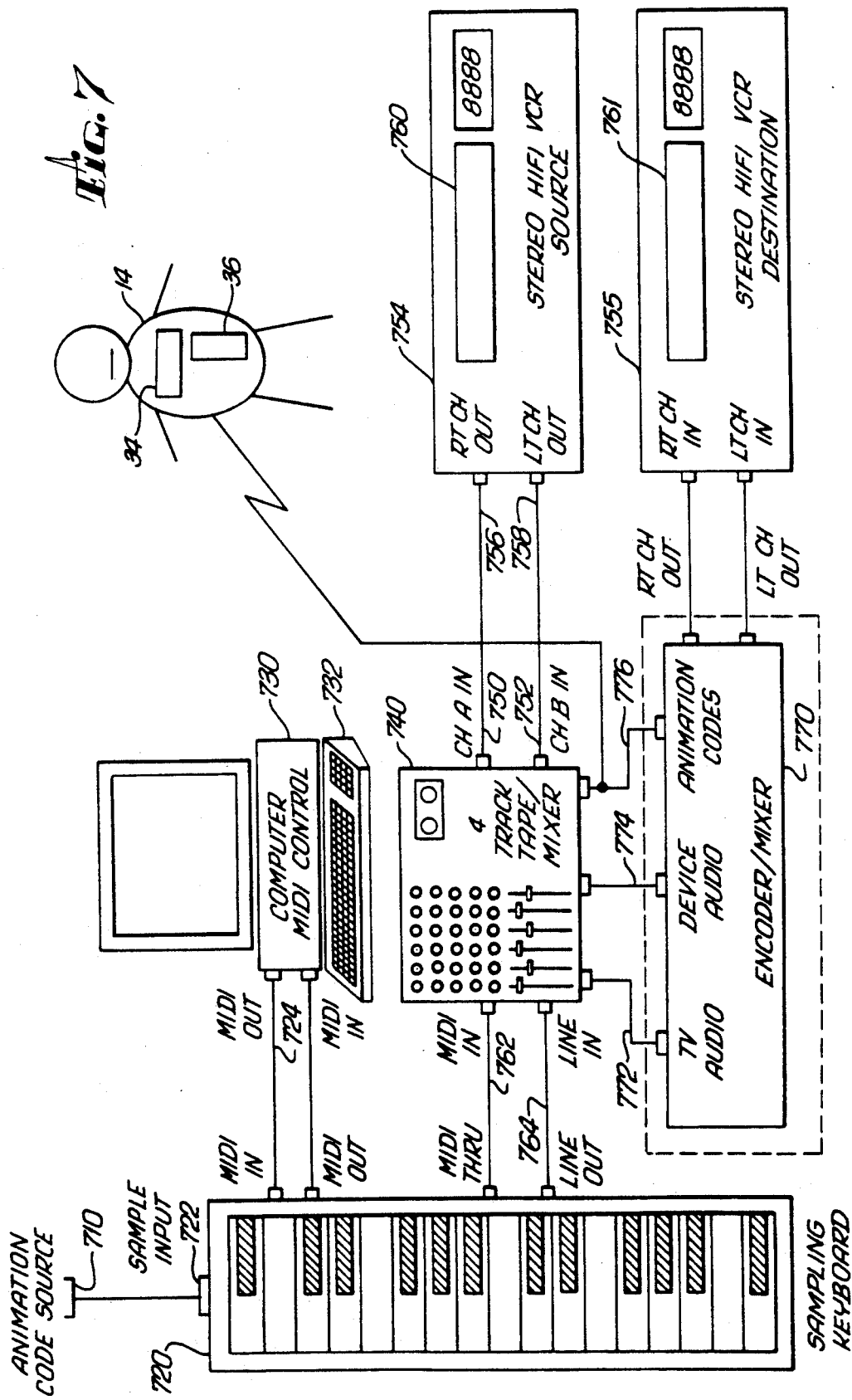
FIG. 7 is a schematic diagram of an audio and kinetic information decoder of an interrelational audio kinetic entertainment system in accordance with this invention.

With particular reference to FIG. 7, an animation code source 710, such as a time varying audio track provides electronically generated audio pulses and/or frequency shift keying signals. The animation code source 710 is coupled to a sampling keyboard 720 at an input 722. The sampling keyboard 720 receives the signal pulses and performs an analog to digital conversion at approximately 30 Khz. The resulting digitized signal is then stored with the sampling keyboard 720 for later retrieval and editing. The sampling keyboard 720 is coupled by a musical instrument interface, such as a MIDI interface (Musical Instrument Data Interface) 724 to a personal computer 730. The MIDI coded control signals are then stored to RAM on the personal computer 730 or sent to floppy or hard disk storage in the computer 730. The sampling keyboard 720, is for example, a Roland W-30 available from Roland Corporation, of Los Angeles, Calif. A 4-track tape and mixer console 740 such as a Tascam 644 tape mixer from Teac America, Inc. of Montebello, Calif., is coupled to the sampling keyboard 720. The tape mixer 740 is typically a multitrack sound on sound style tape mixer of the type used for producing original audio tapes.

The tape mixer has an channel A input 750 and a channel B input 752. The channel A and B inputs 750, 752 typically represent the audio channels of stereo audiovisual programming and are typically coupled to a video cassette recorder 754, here operating as a video cassette player, or equivalent source. Thus, original programming such as microphones might be substituted for the VCR 754. Also, the source might be a video laser disc player or other analogous audiovisual device. The recorder 754 has right channel outputs 756 and left channel outputs 758 representing respectively the right and left channel audio signal associated with the programming associated with a cassette 760 in the VCR 754.

The MIDI interface between a computer keyboard 732 and the sampling keyboard 720 is bidirectional. The sampling keyboard can come under control of the computer 730 and the computer 730 can receive information from the keyboard 720 and store it in its associated file. Each key is typically assigned to a particular movement of the kinetic device 14. The use of the sampling keyboard 720 permits precise visual synchronization of movements of the kinetic device with the programming.

The coupling of the computer with the keyboard 720 is accomplished with music sequencing software such as Music-X, available from Micro Illusions of Chatsworth, Calif. The software permits the assignment of various information to the various keys of the keyboard. For example, the computer when running sequencing software can define the "attack" or how fast it takes to achieve maximum amplitude of the signal represented by a key, the "sustain" or how long the signal lasts, the "decay" or how fast it takes to return to 0, and the amplitude of the signal.

The mixer 740 has a MIDI input 762 that is coupled to the sampling keyboard 720, and a input 764 that is coupled to the sampling keyboard 720. The MIDI input 762 controls the synchronization of existing audio programming, device audio programming and kinetic signals.

The output of the sampling keyboard 720 is applied via the input 764 to the mixer 740 to receive the device kinetic information to be mixed with the existing programming of the cassette 760 and device audio programming.

Figure 8:
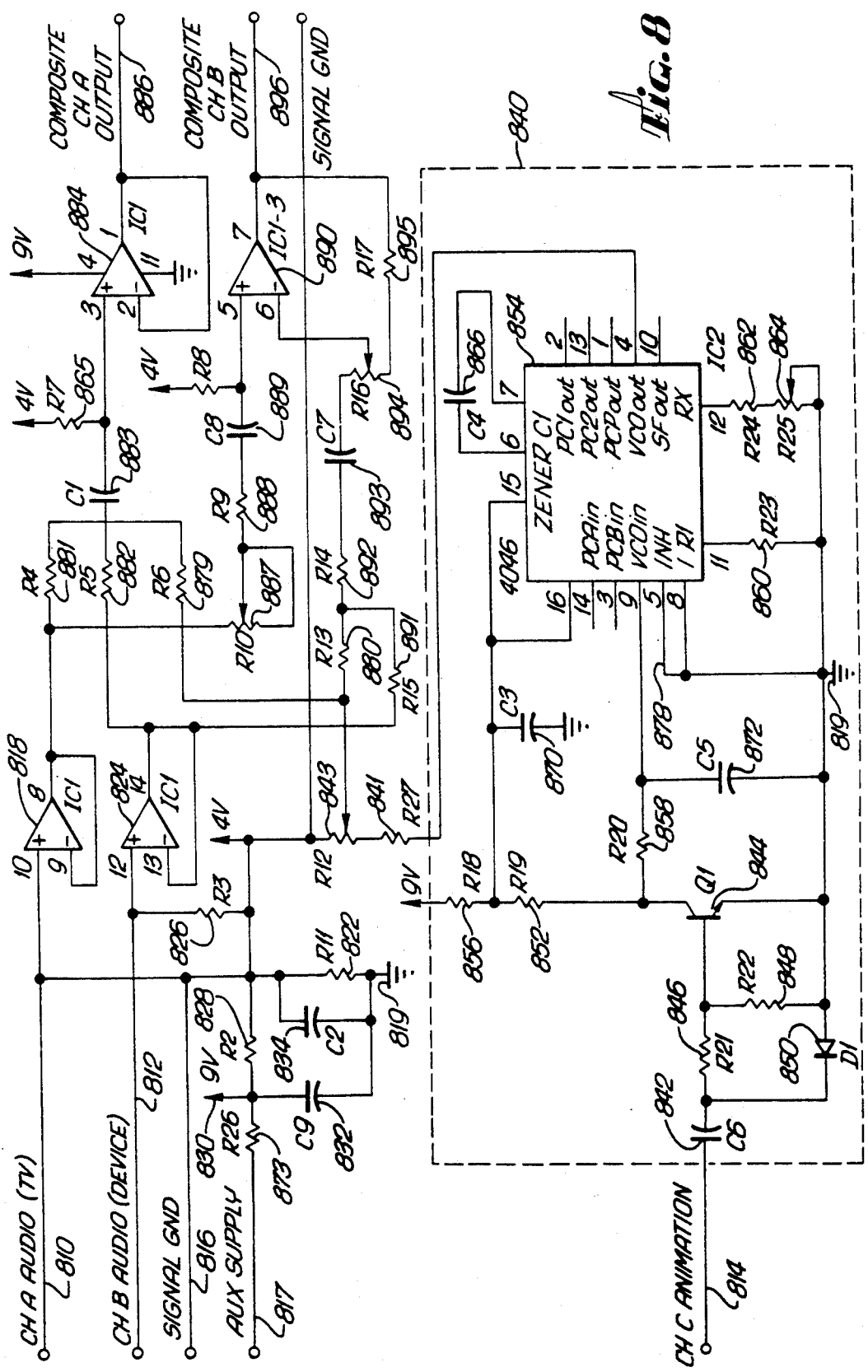
FIG. 8 is a block diagram of an encoder system of an interrelational audio kinetic entertainment system in accordance with this invention.

- The encoder tape mixer 740 is coupled to an encoder mixer 770 of the type shown in greater detail, by way of example, in FIG. 8. The tape mixer 740 has a television audio output 772 coupled to the encoder mixer 770 for applying the existing programming audio from the cassette 760 to the mixer 770. The tape mixer 740 has a device audio output 774 coupled to the encoder mixer 770 for applying the newly created device audio sounds to the encoder mixer 770. The device audio is the sound which is ultimately applied to and heard from the doll or kinetic device 14, and are separately added to the existing programming of the cassette 761 in a destination video cassette recorder 755. Thus the sounds or voices emanating from the toy or device 14 can be entirely different programming from that of the television audio, but can be synchronized in time, with respect to that of the existing audio programming. This permits the viewer to interrelate to the toy or device, and, the programming which is simultaneously appearing on a television screen which plays or represents the existing television images The tape mixer 740 also has a kinetic code output 776 coupled to the encoder/mixer 770. The kinetic code output represents the kinetic information codes which were created with the sampling keyboard. The sampling keyboard 720 provides kinetic coding to be synchronized with the device audio programming and in synchronization with that programming. A kinetic device 14 is coupled to the kinetic code output 776 so that the person adding the enhanced kinetic programming to the exiting audiovisual material is able to have visual feedback as to the manner in which the sequencing of the keyboard is results in specific motions of the kinetic device 14.

It should be recognized that there is the possibility of live interaction so that the input to the tape mixer could be simply a microphone input and the right channel output and left channel output could be connected directly to a typical television transmission system 16 of FIG. 1.

With particular reference to FIG. 8, an encoder 12 as depicted in FIG. 1 is shown in greater detail schematically. As in FIG. 1, the inputs to the encoder 12 are the channel A audio input 810, the channel B audio input 812 and a channel C kinetic input 810. The channel A audio input 814 represents the audio signals from the television source or VCR or other programming source. Channel B represents the audio signal which carries the audio information for the doll 14. Channel C input 814 represents the animation signals.

Also represented as inputs are a signal ground 816 and an auxiliary power supply 817.

The audio input 810 is coupled to ¼ of a MC 3403 quad operational amplifier, configured as a unity gain buffer amplifier 818 for isolating the channel A audio signal for later mixing downstream. A 100 K resistor 820 (R01) is coupled from the channel A audio input 810 and signal ground 816. A 39K resistor 822 (R11) is coupled between the signal ground 816 and the supply ground 819. The resistor 820 (R1) provides a signal reference point to the signal ground 816, of about 4 VDC.

Similarly, the Channel B audio input 812 is coupled to ¼ of a MC 3403 quad operation amplifier, also configured as a unity gain buffer amplifier 824 for isolating the Channel B audio for mixing downstream.

A 100K resistor 826 (R03) is coupled between the channel B input and the signal ground 816. A 47K resistor 828 (R02) is coupled between the signal ground 816 and a nine volt voltage supply 830. A 10 μF filter capacitor 832 C9 is coupled between the 9 volt supply voltage 830 and supply ground 819. A 2.2 μF filter capacitor 834 (C2) is coupled between the signal ground and supply ground 819.

The combination of resistors 822, 828 and the capacitors 832, 834 are used to establish and stabilize the signal ground 816 and the positive supply voltage 836 at approximately +4V and +9V (Vcc), respectively.

A kinetic modulator 840 receives the Channel C kinetic input 814. A 1 μF capacitor 842 (C6), is coupled to the kinetic input 814, which decouples the DC signal and is then applied to an NPN transistor switch circuit. The transistor switch circuit comprises a 2N3904 transistor 844 (Q1), a 10K resistor 846 (R21) and a 100K resistor 848 (R22). Resistor 846 is the base drive resistor for transistor 844 and resistor 848 is a reverse bias resistor to turn transistor 844 (Q1) off. The emitter of the transistor 844 is grounded. The resistors 846, 848 are coupled at one end to the base of transistor 844. The other end of the resistor 846 is coupled to the capacitor 842 and the other end of resistor 848 is grounded. A 1N4001 zener diode 850 (D1) having the cathode coupled to the other end of resistor 846 and the capacitor 842, and the anode grounded. Effectively, the diode 850 limits the voltage swing when dipping below V − to 0.6 volts.

A 22K resistor 852 (R19) is a pullup resistor and is coupled at one end to the collector of transistor 844 and at the other end to a pin 16 of a phase lock loop 854 such as an RCA or Motorola 4046. When transistor 844 (Q1) turns on pulling the VCO input towards ground, a VCO shift control signal is fed to pin 9 of the phase lock loop, a 4046, such as by Motorola or RCA. The phase lock loop has a voltage control oscillator (VCO) set to 20 Khz, but can be set from 12 Khz to 20 Khz depending on the specific result desired.

A 1K resistor 856 (R18) is a supply resistor for the zener diode in the phase lock loop 854. A 100K resistor 858 (R20) shifts the VCO frequency during the on condition of transistor 844 (Q1).

A 680K resistor 860 (R23) is coupled between pin 11 of the phase lock loop 854 and ground 819. A 47K resistor 862 (R24) is coupled in series with a 100K trimming pot 864 (R25) to ground. A 0.001 82 F capacitor 866 (C4) is coupled between pins 6 and 7 of the phase lock loop. The combination of the phase lock loop 854, resistors 860, 862, 864 and capacitor 866 generates a 20 Khz carrier. Resistors 860, 862 set up the free oscillator frequency and symmetry. The pot 864 adjusts the frequency to trim it to the value of approximately 20 Khz.

A transistor 844 (Q1) shifts the 20 Khz signal. This gives a data stream which is the combination of the data and the carrier.

Capacitor 866 (C4) is the charge and discharge capacitor for the device which sets up the time constant for the VCO. The combination of resistors 860, 862, 864 set up uniform, square wave pulses for balancing the pulse duration. A 0.1 µF capacitor 870 (C3) is a filter coupled between pins 15 and 16 of the phase lock loop 854 at one end and ground at the other end. A 0.002 µF capacitor 872 (C5) is a filter that controls voltage rise and fall time and noise within the VCO input.

A resistor 873 (R26) provides a voltage drop for an auxiliary supply if it is utilized, such as an external auxiliary supply. A 10 µF capacitor 874 coupled from a 9 volt supply to supply ground, and a 2.2 µF capacitor 875 (C2) coupled in parallel to a 39K resistor 876, coupled between signal ground 816 and supply ground filter and the supply.

The inhibit output 878 of the 4046 phase lock loop 854 is brought to ground which enables the VCO output. The VCO output is applied as a divider, referenced to the signal ground for input to a resistor 10K resistor 879 (R06) as well as input to a 10K resistor 880 (R13). A 10K resistor 881 provides the channel A audio signal, a 10K resistor 882 provides the channel B audio signal, and resistor 879 provides the kinetic signal. Thus, all the signals are now present at resistors 879, 881 and 882, and one end of each of the three resistors are joined. The other end of the resistor 881 is coupled to the output of the operational amplifier 818, and the other end of the resistor 882 is coupled to the output of the operational amplifier 824. This results in a combined signal at the node following resistors 879, 881, 882 representing channel A plus channel B plus channel C. The combination of the signals are decoupled through a 0.1 µF decoupling capacitor 883 (Cl), the other side of which is coupled through the positive input an operational amplifier 884 which is another ¼ of the MC 3403. This signal is referenced through a resistor 865 (R7) coupled to signal ground and fed into the plus input of the operational amplifier 884 coupled as another buffer or unity gain amplifier. The output 886 of the operational amplifier 884 is the composite of channel A plus channel B plus channel C. This output becomes one of the audio inputs to the destination VCR.

A 100K null adjustment potentiometer 887 (R10), level shifts the channel A normal audio from television and through a 330K resistor 888 (R9) and a 0.1 µF capacitor 889 (C8), applies to the non inverting input of an operational amplifier 890 the last ¼ of the MC 3403 IC package. Thus, the output as applied from channel A becomes the nulled referenced input to this last ¼ of the MC 3403 operational amplifier.

The channel B audio goes through a 10K resistor 891 and is joined with the kinetic carrier through a 10K resistor 880 (R13). A 10K resistor 892 (R14) passes the combined signals of channel B and channel C through a 1 µF decoupling capacitor 893 (C7), which is then applied through a 2K potentiometer 894 (R16) to the inverting input of the operational amplifier 890 (ICl-3). A 10K resistor 895 (R17) sets the gain for the operational amplifier. The resulting composite input is the sum of the inverted channel B plus the inverted channel C at the composite output 896.

The resulting composite signals at outputs 886, 896 preconditions and phase shifts the signals to provide acceptable outputs for recording or transmission.

Figure 9:
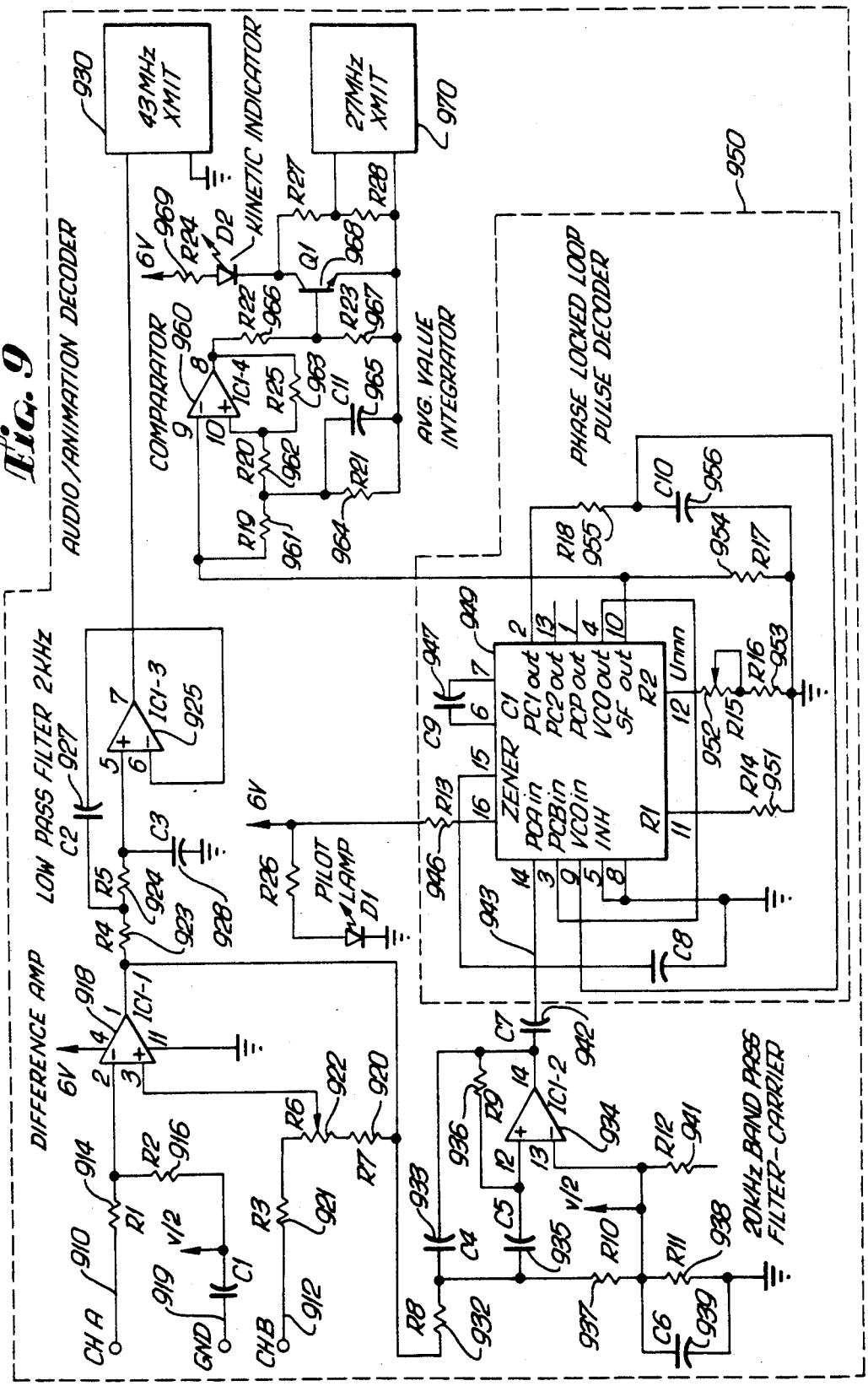
FIG. 9 is a schematic diagram of an encoder mixer of an interrelational audio kinetic entertainment system in accordance with this invention.

With particular reference to FIG. 9, a schematic of the audio and kinetic decoder is shown. Typically, this is part of the apparatus present at the home after transmission. The decoder demodulates and separates the primary television audio program, the device audio and the device kinetic signals. Inputs to the decoder are the channel CH A signal at input 910 and a CH B signal at input 912. These inputs generally represent the right and left stereo audio channel outputs from the television receiver, video cassette recorder or comparable device.

The combination of a 10K resistor 914 (R1) and a 10K resistor 916 (R2) are set up as a signal divider. The resistor 914 is coupled at one end to the channel A input 910 and at the other end to the inverting input of an operational amplifier 918. The operational amplifier 918 is ¼ of a MC3403 quad operational amplifier (ICl-1). A 0.001 µF capacitor 919 (C1) coupled between ground and the other end of the resistor 916. The capacitor 919 is a supply filter for the signal ground and is also coupled to ¼ of the positive voltage supply V+. A 10 K resistor 920 (R7) also provides the function of a gain control to the operational amplifier 918 (IC 1-1).

A 10K resistor 921 (R3) receives signals from the channel B input 912 and is coupled to a 2K potentiometer 922 having its opposite lead connected to resistor 920. The combination of resistors 920 and 921 and photentiometer 922 provides a signal divider. That signal at resistor 920 is fed to the noninverting input of the operational amplifier 918 (ICl-1). The operational amplifier 918 is configured as a differential amplifier and is there to extract the composite left channel information from the right channel information.

A 39K resistor 923 is coupled from the output of the operational amplifier 918 to another 39K resistor 924, which in turn is coupled to the input of a different operational amplifier 925. The operational amplifier 925 is ¼ of a MC3403 integrated circuit package.

The resultant signal at the output of operational amplifier 918 is fed through resistors 923, then 924 and to the noninverting input of operational amplifier 925 (IC1-3).

A 0.01 µF capacitor 927 (C02) is between resistors 923 and 924 at one end, and the output of the operational amplifier 925 at the other end. A 0.001 µF capacitor 928 (C03) is coupled at one end to the noninverting input of the operational amplifier 925 and at the other end to ground. The combination of resistors 923, 924 and capacitors 927, 928 and the operational amplifier 925 (IC1-3) form a low pass filter section for separating out the doll or device audio signal. Thus, the output at pin 7 of the operational amplifier 925 is the device or doll audio.

The output of operational amplifier 925 is fed to a 49 mhz transmitter 930 of existing design. The result is that dolls audio has been selected out and applied to the transmitter for retransmission to the kinetic device in the form of an audio signal.

At the composite left channel input 912, a resistor 932 (R8) takes the resultant signal from the differential amplifier 918 (IC1-1) which is coupled to the noninverting input of an operational amplifier 934 (IC1-2), again a different ¼ of the MC3403 quad operational amplifier package. A 0.001 µF capacitor 935 (C5) connected between the resistor 932 and the noninverting input, acts as a decoupling capacitor for the signal applied to the noninverting input. A 0.001 µF capacitor 933 (C4) is coupled from the output of the operational amplifier 934 to resistor 932. A 100K resistor 936 (R9) is coupled from the output of the operational amplifier 934 to the noninverting input. Operational amplifier 934 (IC 1-2) which has pin designations 12, 13 and 14, and the combination of a network which comprises capacitors 933, 935, 937, resistors 936, 937 and 938 comprise a 20 Khz bandpass filter for separating the 20 KHz carrier, so that the output at pin 14 of the optional amplifier 934 is the 20 Khz kinetic carrier separated out from the audio information resulting in a signal representing the kinetic carrier and the kinetic information signal.

A 680 ohm resistor 937 (R10) is coupled from resistor 932 to a 10K resistor 938 (R11) and is at that junction coupled to ½ V+. The resistor 938 is coupled at the opposite end to ground and has a 0.22 µF capacitor 939 (C6) connected to it in parallel, which provides a filter for ½ of V+. The combination of resistors 937, 938 as referenced to ½ V+ is coupled to the inverting input of operational amplifier 934. A 10K resistor 941 (R12) is coupled from the inverting input of operational amplifier 934 at one end to V+ at the other end, the combination of R11 and R12 form a divider for ½ V+.

A 0.0047 µF capacitor 942 (C7) decouples the resultant output and is fed into the a PCAin pin 943 of the a 4046 phase lock loop decoder 950. The phase lock loop decoder 950 has a zener regulated power supply. A 1K resistor 946 (R13) is a dropping resistor for a zener regulated supply of the phase lock loop decoder 950. A 0.001 µF capacitor 947 (C9) is coupled across pins 6 and 7 of the phase lock loop pulse decoder 950 and operates as the timing capacitor for the VCO.

A 270K resistor 951 (R14) is coupled from pin 11 a 4046 integrated circuit 949 of the phase locked loop pulse detector 950 to ground. A 100K trim potentiometer 952 (R15) is coupled from pin 12 of the integrated circuit 949 to a 47K resistor 953 (R16) in series which in turn is connected to ground. The combinations of resistor 951, potentiometer 952 and resistor 953 set the VCO free running output frequency and symmetry. A 10K resistor 954 (R17) is coupled from pin 10 of the integrated circuit 949 to ground and acts as a pull down resistor for the output of the difference signal, that is, the demodulated output of the 20 kHz carrier. The resultant output signal at pin 10 of the integrated circuit 949 is the original kinetic data stream stripped of the 20 Khz carrier.

A 15K resistor 955 (R18) is coupled to pin 2, the PC1 output of the integrated circuit 949, and at the other end to a 0.01 µF capacitor 956 (C10) which in turn is coupled to ground. Pin 9 of the integrated circuit 949 is coupled to the junction of resistor 955 and the capacitor 956. The resistor 955 and the capacitor 956 form a locking filter loop.

The output at pin 10 of the integrated circuit 949 is coupled to the inverting input of an operational amplifier 960, again a separate ¼ of a quad operational amplifier package. A 100K resistor 961 and a 68K resistor 962 are coupled between the inverting and noninverting inputs of the operational amplifier 960. The combination of resistors 961, 962 supply the noninverting input of IC1-4. A 1M resistor 963 is coupled from the noninverting input of operational amplifier 960 to the output of the operational amplifier 960 which sets the gain of the operational amplifier 960. A 330K resistor 964 (R21) and a 0.47 µF capacitor 965 (C11) are coupled in parallel and are coupled at one end to the junction of resistors 961, 962, and at the other end to ground.

A 10K resistor 966 (R22) is coupled from the output of operational amplifier 960 to a base of a transistor 968 (Q1), forming a base drive to transistor 968 (Q1). A 10K resistor 967 (R23) reverse biases transistor 968 (Q1). A 1K resistor 969 (R24) is coupled from the collector of transistor 968 to a 6 volt voltage supply, and acts as a pull up feed resistor. The emitter of the transistor 968 is coupled to ground. The resulting on off pulses at the collector of transistor 968 are equivalent to the initial kinetic code stream and then are applied to a 27 Mhz transmitter 970 of existing art.

In the phase locked loop pulse decoder circuit, the carrier and kinetic signal information is stripped of the carrier and applied to the comparator circuit at operational amplifier 960. The operational amplifier 960 acts as an average value integrator. This takes the result pulses coming out of pin 10 of the integrated circuit 949 of the phase lock looped pulse decoder circuit 950 and integrates them into the comparator forming output pulses essentially identical to the original kinetic codes. Transistor 968 drives the following 27 Mhz transmitter of existing design.

In operation, the enhanced programming is created prior to broadcast, or prior to manufacture of the audiovideo media. The control signals of the audio kinetic device are sampled and are then assigned by the computer 730 specific identifiable movements of the audio kinetic device 14 and characteristics such as duration and amplitude. In order to accurately and creatively engage in the simultaneous synchronized programming, an audio kinetic device is coupled to the mixer during the programming for feedback to the programmer of the actions which are recorded by keystrokes made on the sampling keyboard 720. Also, the existing programming such as from a cassette 760, is also simultaneously played for audio and visual feedback to the person creating the enhanced programming for the audio kinetic device. Device audio along with the control signals generated by the keyboard 720 are then recorded o the destination VCR cassette 761.

The destination cassette 761 is then applied to the television transmitter 16 as indicated in FIG. 1. where it is broadcast, or sent by cable or other television delivery system. Remotely located television receivers 24 receive the programming. The ordinary audiovisual portion of the programming is received as usual and is displayed on television receivers and heard on the loudspeakers of television receivers. However, the stereo audio outputs of the television receiver 24 or other stereo audio demodulator provides first and second audio signals that have embedded both device audio and also kinetic audio signals. Those signals are applied to a decoder/transmitter where the device audio and kinetic signals are separated. After separation, the device audio and kinetic signals are transmitted locally, typically from a system adjacent the television receiver or cable box, to a spaced apart location adjacent the viewer where the audio kinetic device is located.

The audio kinetic device, typically, though not necessarily an animated doll or plush animal, receives the locally transmitted device audio and kinetic signals. The kinetic signals are further decoded for application to the motors of the audio kinetic device and causing motion of the audio kinetic device. The audio signal is demodulated and applied to the loudspeaker in the audio kinetic device. The result is that in addition to the programming appearing on the television screen and at the loudspeaker of the television receiver, the audio kinetic device is moving, speaking and making sounds, simultaneously in real time as the programming displayed and heard from the television.

Since the character voices originate from actors and voice characterization specialists, and are received at the remote location with essentially all their original qualities in complete synchronization with the normal program, the performance integrity, with all the subtle though essential attributes of tonal inflection, volume, accent, timing, emotion and energy originally intended by the author of the programming and portrayed by the actor is recreated giving an entirely different perspective and dimension to the programming.

It should be recognized that other television delivery systems may be used in accordance with this invention. Various transmission frequencies may be used. A VCR video playback system or analogous playback systems, such as laser disk or other systems may be substituted for the front end or television transmitter. Thus, rather than distant broadcasting, origination of the video, audio and kinetic signals may originate locally, such as at the consumer's home and be broadcast locally directly from adjacent to a video cassette player or other audiovisual playback device, to an audio kinetic device. Local transmission may also be made, for example, by infrared or ultrasonic devices in place of transmission by electromagnetic radiation.

While the invention has been described with reference to specific forms thereof, it will be understood that changes and modifications maybe made within the spirit and scope of this invention.

What is claimed is:

1. An interrelational audio-kinetic entertainment system for providing real time simultaneous program synchronized audio-kinetic movements in a remotely located audible kinetic device, the audible kinetic device of the type moveable in response to kinetic signals and audible in response to an audible signal, comprising:

means for generating a device-driving audio and kinetic signal complex in real time simultaneous synchronization with, yet distinguishable from an audiovisual program signal;

means for transmitting the device-driving audio and kinetic signal complex to a location whereby the device-driving audio and kinetic signal complex as utilized by an audible kinetic device maintains real time simultaneous synchronization with the audiovisual program signal;

means at said location for performing an audiovisual program in response to the audiovisual program signal; and means independent of the performance of the audiovisual program for receiving the transmitted device-driving audio and kinetic signal complex and applying a decoded device-driving audio and kinetic signal complex responsive to the received device-driving audio and kinetic signal complex to an audible kinetic device for causing real time simultaneous program synchronized sound and motion of an audible kinetic device.

2. An interrelational audio-kinetic entertainment system for providing real time simultaneous program synchronized audio-kinetic movements in a remotely located audible kinetic device, the audible kinetic device of the type moveable in response to kinetic signals and audible in response to an audible signal, comprising:

generation means for generating a device-driving audio and kinetic signal complex in real time simultaneous synchronization with, yet distinguishable from an audiovisual program signal;

means for transmitting the device-driving audio and kinetic signal complex to a location whereby the device-driving audio and kinetic signal complex as utilized by the audible kinetic device maintains real time simultaneous synchronization with the audiovisual program signal;

means for receiving the transmitted device-driving audio and kinetic signal complex and applying a decoded device-driving audio and kinetic signal complex responsive to the received device-driving audio and kinetic signal complex, to the audible kinetic device for causing real time simultaneous program synchronized sound and motion of the audible kinetic device; and wherein the device-driving audio and kinetic signal complex generation means comprises sampling keyboard means for generating a program-synchronized kinetic signal for an audible kinetic device, the sampling keyboard means being responsive to an audible kinetic device compatible coding signal.

3. The invention as set forth in claim 2 and in which the entertainment system is adapted for use with a stereo television signal having first and second audio channels, and the device-driving audio and kinetic signal complex generation means comprises means for carrying an audio signal for the audible kinetic device on the second audio channel of a stereo television signal.

4. The invention as set forth in claim 3 and in which the entertainment system is adapted for use with a stereo television signal having first and second audio channels, and the device-driving audio and kinetic signal complex generation means comprises means for carrying a kinetic signal for the audible kinetic device on the second audio channel of a stereo television signal.

5. An interrelational audio-kinetic entertainment system for providing real time simultaneous program synchronized audio-kinetic movements in a remotely located audible kinetic device, the audible kinetic device of the type movable in response to kinetic signals and audible in response to a device audible signal, comprising:
- means for generating a device-driving audio and kinetic signal complex in real time simultaneous synchronization with, yet distinguishable from an audiovisual program signal;
- transmitting means for transmitting the device-driving audio and kinetic signal complex to a location whereby the device-driving audio and kinetic signal complex as utilized by the audible kinetic device maintains real time simultaneous synchronization with the audiovisual program signal; and
- receiving and decoding means for receiving the transmitted device-driving audio and kinetic signal complex and applying a decoded device-driving audio and kinetic signal complex responsive to the received device-driving audio and kinetic signal complex to the audible kinetic device for causing real time simultaneous program synchronized sound and motion of the audible kinetic device; wherein the receiving and decoding means comprises stereo television demodulator means for supplying first and second channel television stereo audio signals and means for decoding the first and second channel television stereo audio signals to obtain a device audio signal and kinetic signal for the audible kinetic device.

6. An interrelational audio-kinetic entertainment system for providing real time simultaneous program synchronized audio-kinetic movements in a remotely located audible kinetic device, the audible kinetic device of the type movable in response to kinetic signals and audible in response to a device audible signal, comprising:
- means for generating a device-driving audio and kinetic signal complex in real time simultaneous synchronization with, yet distinguishable from an audiovisual program signal;
- transmitter means for transmitting the device-driving audio and kinetic signal complex to a location whereby the device-driving audio and kinetic signal complex as utilized by the audible kinetic device maintains real time simultaneous synchronization with the audiovisual program signal; and
- receiver means for receiving the transmitted device-driving audio and kinetic signal complex and applying a decoded device-driving audio and kinetic signal complex responsive to the received device-driving audio and kinetic signal complex to the audible kinetic device for causing real time simultaneous program synchronized sound and motion of the audible kinetic device;
- stereo television demodulator means having stereo audio output means for providing first and second stereo audio signals;
- audio demodulator and separator means responsive to the stereo audio output means of the stereo television demodulation means for developing separate device audio signals and kinetic signals; and
- means for applying the separate device audio signals and kinetic signals to the transmitter means.

7. The invention as set forth in claim 6 and in which the transmitter means comprises:
- means for transmitting the device audio signal on a 49 Mhz carrier; and
- means for transmitting the kinetic signal on a 27 MHz carrier signal;
- and in which the receiver means comprises means for receiving and demodulating the device audio signal at the audible kinetic device; and
- means for receiving and demodulating and applying the kinetic code to the kinetic device, whereby the kinetic device is articulatable and emits audio sounds simultaneously in real time simultaneous synchronization with the audiovisual device programming.

8. The invention as set forth in claim 6 and in which:
- the transmitter means comprises a low power FM broadcast band stereo transmitter having first and second stereo inputs and means for applying the separate device audio signals to one stereo input and the kinetic signal to the second stereo input;
- and in which the stereo television receiver means comprises FM broadcast band receiver means for receiving and demodulating the separate device audio signals and the kinetic signals at an audible kinetic device.

9. An interrelational audio-kinetic entertainment signal generating system for use in connection with a television broadcast system for providing real time audio-kinetic movements in a remotely located kinetic device, which are synchronized to a simultaneously broadcast program, comprising:
- means for generating a device-driving audio and kinetic signal complex in real time simultaneous synchronization with an audiovisual program signal;
- means for applying the device-driving audio and kinetic signal complex to the audio channel of the television broadcast system in synchronization with the program signal;
- means for receiving the transmitted device-driving audio and kinetic signal complex with the audiovisual program signal at a remote location from the broadcast system and in proximate spaced apart relation from an audible kinetic device;
- means for separating the device audio and kinetic signals from audiovisual programming signals;
- local transmission means for communicating device audio and kinetic signals to the audible kinetic device located in proximate spaced apart relationship to the local transmission means; and
- local receiving means for receiving audio and kinetic signals from the local transmission means for coupling to the audible kinetic device;
- whereby the audible kinetic device may be made articulatable and audible in real time simultaneous synchronization with audiovisual programming.

10. The invention as set forth in claim 9 and in which the device-driving audio and kinetic signal complex generation means comprises a sampling keyboard for generating kinetic sequencing codes synchronized with an audiovisual programing signal.

11. The invention as set forth in claim 9 and comprising:
- an audible kinetic device of the type having multiple motors for exhibiting plural movements in response to plural coded signals and a speaker for emitting audible sounds from the audible kinetic device;
- means for decoding the kinetic signal from the local transmission means and providing means for causing motion to the kinetic device in response to the kinetic signal; and
- means for communicating the separate audio signal to the kinetic device.

12. The invention as set forth in claim 9 wherein the television broadcast system has first and second stereo audio channels and in which the device-driving audio and kinetic signal complex generating means has an audio output coupled to the second stereo audio channel of the television broadcast system.

13. The invention as set forth in claim 9 wherein the television broadcast system has first and second stereo audio channels and in which the device-driving audio and kinetic signal complex generating means has a kinetic data output coupled to the second stereo audio channel of the television broadcast system.

14. The invention as set forth in claim 13 and in which:
- the device-driving audio and kinetic signal complex generating means comprises a kinetic code generator encoder;
- a modulator having a frequency of between about 12 and 20 Khz coupled to the kinetic code generator encoder;
- means coupled to the modulator for providing a kinetic signal phase shifted by 180°; and
- means for applying a composite stereo signal responsive to the first channel stereo audio signal and the second channel stereo audio signal to be transmitted by the television broadcast system.

15. The invention as set forth in claim 14 and in which:
- means for developing a first channel audio composite stereo signal comprising an original program audio signal, the kinetic device audio signal and the kinetic signal; and
- means for developing a second channel stereo signal comprising the device audio signal phase shifted 180° and a kinetic signal phase shifted 180°; and
- means for applying a composite stereo signal responsive to the first channel stereo signal and the second channel stereo signal to be transmitted by the television broadcast system.

16. The invention as set forth in claim 15 and comprising decoder means for separating audio and kinetic device signals from audio program signals, comprising:
- difference means for developing a signal responsive to the difference between the first and second audio channels;
- low pass filter means responsive to the difference means for passing an audio signal to a transmitter;
- phase locked loop decoder means for separating the kinetic signal from a 12 KHz to 20 KHz carrier.

17. An interrelational audio-kinetic entertainment system for providing audio-kinetic movements in a remotely located device, in response to a device-driving audio and kinetic signal complex synchronized with an audiovisual program signal comprising:
- demodulating means for obtaining television audio signals representing first and second stereo audio channels containing embedded device audio and kinetic signals;
- means for transmitting a device-driving audio and kinetic signal complex representing device audio and kinetic signals to proximate spaced apart location whereby the device-driving audio and kinetic signal complex as ultimately utilized by a kinetic device maintains synchronization with the audiovisual program signal; and
- means for receiving the transmitted device-driving audio and kinetic signal complex at the proximate spaced apart location, whereby a decoded device-driving audio and kinetic signal complex responsive to the received device-driven audio and kinetic signal complex is provided for causing program synchronized sound and motion of a device located remote from the transmitter means.

18. The invention as set forth in claim 17 and comprising an audio-kinetic device responsive to kinetic signals for causing movement to the device in real time simultaneous synchronization to audio visual programming, and responsive to an audio signal, the audio-kinetic device being coupled to the receiving means.

19. The invention as set forth in claim 18 and in which the audio-kinetic device comprises a cassette player having tape playback head means for communicating audio sounds to a loudspeaker and for communicating control data signals for causing various movements to the audio-kinetic device;
- modular cassette adapter means for communicating kinetic signals and device audio signals to the device through the cassette player of the audio-kinetic device, the modular cassette adapter means configured to coat in operable engagement with the cassette player of the audio-kinetic device; and
- the modular adapter means including the receiver means and means for decoding the transmitted signal complex to audio and kinetic signals and communicating the audio and kinetic signals to the device, the modular cassette adapter communicating means having tape head means for coupling the audio and kinetic signals to the playback head means of the cassette player of the audio-kinetic device.

20. The invention as set forth in claim 17 and comprising:
- audio demodulator and separator means responsive to the stereo channels for developing a separate device audio signal and a kinetic signal;
- means for applying the device audio signal to the transmitting means; and
- means for demodulating the kinetic signal and applying the demodulated kinetic signal to the transmitting means.

21. The invention as set forth in claim 20 and in which the transmitting means comprises:
- 49 MHz carrier transmitting means for carrying the device audio signal to a proximate spaced apart location; and
- 27 MHz transmitting means for carrying the kinetic signal to the proximate spaced apart location; whereby remote control radio frequency transmitters are used to carry the kinetic and device audio signals to the audio-kinetic device.

22. The invention as set forth in claim 20 and in which the receiving means comprises a 49 MHz receiving means for receiving the device audio signal at the proximate spaced apart location and 27 MHz receiving means for receiving the kinetic signal at the proximate spaced apart location.

23. The invention as set forth in claim 20 and in which the transmitter means comprises a low power broadcast band FM stereo transmitter having a carrier frequency range of between 88 and 108 MHz., the FM stereo transmitter having separate first and second audio input channels;

the device audio signal is applied to the first channel of the FM stereo transmitter;

the kinetic signal is applied to the second channel of the FM stereo transmitter.

24. The invention as set forth in claim 23 and comprising FM stereo receiving means for receiving the device audio and kinetic signals, the FM stereo receiving means including means for separating the first stereo channel and coupling the signal from the first stereo channel to a loudspeaker in the audio-kinetic device, and means for separating the second stereo channel, decoding the signal from the second stereo channel and applying the decoded kinetic signal to motor drivers in the audio-kinetic device.

25. The invention as set forth in claim 24, and comprising:

difference signal means for obtaining a signal representing the difference of the first and second stereo audio channel signals;

filter means for separating out the device audio signal, the filter means coupled to the difference signal means;

bandpass means for separating out a kinetic signal from a kinetic signal carrier;

phase lock loop pulse decoder means for stripping away the carrier from the kinetic signal, the phase lock loop pulse decoder means coupled to the bandpass means; and integrator means for developing a signal stream responsive to the kinetic signal for causing specific motion of the audio-kinetic device.

26. An encoding system for generating a separate device-driving audio and kinetic signal complex in synchronization with yet distinguishable from an audiovisual program signal for an interrelational audio-kinetic entertainment system for providing audio-kinetic movements in a remotely located articulatable device which are synchronized with a program, comprising:

sampling keyboard means for generating real time simultaneous program-synchronized kinetic movement signals signal for a kinetic device, the sampling keyboard means responsive to an articulatable device compatible source code input, the sampling keyboard means comprising an electronic musical keyboard having an input for receiving a sampling source signal and the electronic musical keyboard being responsive to a source code input to output kinetic information codes;

a device audio source for a device audio signal for the audio-kinetic device;

an audiovisual program source having plural audio outputs for outputting an audiovisual programming audio output signal; and mixer means for receiving the audiovisual programing audio output signal from an audio output of the audiovisual program source, the device audio signal for the audio-kinetic device and the kinetic information codes responsive to the sampling keyboard means, the mixer means being coupled to the audiovisual program source, the sampling keyboard means, and the device audio source, the mixture means for generating a complex first and second audio channel codes, the first audio channel codes having kinetic and device audio codes embedded therein.

27. The invention as set forth in claim 26 and comprising:

an audible kinetic device of the type having multiple motors for exhibiting plural movements in response to plural coded signals and a speaker for emitting audible sounds from the audible kinetic device, the audible kinetic device coupled to the mixer means whereby the audible kinetic device is movable in response to keyboarding of the sampling keyboard, so that a programmer using the keyboard means is provided with visual and audible feedback during a programming process.

28. The invention as set forth in claim 26 and comprising:

a musical instrument interface coupling the mixer means to the sampling keyboard; and computer means for causing the keyboard means to assign particular keys to define particular movement related signals to a kinetic device and to the duration of the movement, the computer means coupled to the sampling keyboard by a MIDI based interface.

29. The invention as set forth in claim 26 and comprising encoder means coupled to the mixer means, the encoder means comprising:

means for providing a first composite audio signal bearing signal components equivalent to the combination of normal program audio, device audio and modulated kinetic data signals; and means for providing a second composite audio signal bearing components equivalent to the combination of the device audio signal phase shifted by 180° and the modulated kinetic data signals phase shifted by 180°.

30. The invention as set forth in claim 29 and comprising:

first operational amplifier means for obtaining a signal at its output equivalent to the audiovisual programing audio output signal;

first load means applied to the output for receiving the audiovisual programing audio output signal;

second operational amplifier means for developing a signal at the output equivalent to the device audio signal;

second load means applied to the second operational amplifier means output for receiving the device audio signal;

means for modulating the kinetic information signal with a carrier frequency;

third load means applied to the output of the kinetic information signal modulating means for receiving the modulated kinetic information signal;

third operational amplifier means for developing a composite signal representing the audio device signal and the modulated kinetic information signal, and means for applying a signal representing the audio device signal and the modulated kinetic information signal to an inverting input of the third operational amplifier means.

31. The invention as set forth in claim 26 in which the mixer means comprises:

means for applying the plural audio outputs of the audiovisual program source, transferring the plural audio outputs through a musical instrument interface mans for coupling to the sampling keyboard means, and for receiving the output of the sampling keyboard through a musical instrument interfaced means and supplying separate outputs for the audiovisual program audio signal, the device audio and the kinetic movement signals.

32. The invention as set forth in claim 31 and comprising computer interactive control means coupled via a musical instrument interface to the sampling keyboard means.

33. The invention as set forth in claim 30 and in which the modulating means comprises:

pulse code modulation means for providing a carrier signal;

means for coupling the carrier signal with a location signal, whereby the device-driving audio and kinetic signal complex as ultimately utilized by a kinetic device maintains synchronization with the audiovisual program signal; and means for receiving the transmitted device-driving audio and kinetic signal complex at a remote location, whereby a decoded device-driving audio and kinetic signal complex responsive to the received device-driving audio and kinetic signal complex is provided for causing program synchronized sound and motion of a device located remote from the transmitter means.

34. A method for remotely controlling audible kinetic devices in synchronization with audiovisual programing displayed in spaced apart proximity to the devices, comprising the steps of:

generating a device-driving audio and kinetic signal complex containing a device audio signal and device kinetic signal synchronized with audiovisual programing signals, the audiovisual programming signals containing both a video and an audio component;

transmitting a television signal containing both the video and audio programing components of the audiovisual signals, the audio programing component comprising two channel stereo, the stereo signal comprising an audio based signal carrying kinetic signal information for the remote kinetic devices;

receiving the broadcast television signal at a remote location;

displaying and making audible the audiovisual programing at the remote location;

transmitting the device audio signal and the device kinetic signal locally to a proximately spaced apart location;

receiving the device audio signal and the kinetic signal at a proximate spaced apart location to the remote location where the audiovisual programming is displayed;

applying the device kinetic signal and device audio signal to the kinetic device;

causing the device to move in response to the kinetic signal and to be audible in response to the audio signal, whereby the kinetic device moves and makes audible sounds in real time simultaneous synchronization with the audiovisual programming being displayed.

35. The invention as set forth in claim 34 and in which the step of local transmitting comprises the step of transmitting the device kinetic signal at a first radio control frequency, and the device audio device signal at a second radio control frequency.

36. The invention as set forth in claim 35 and in which the first radio control frequency is 49 Mhz and the second radio control frequency is 27 Mhz.

37. The invention as set forth in claim 34 and in which the step of local transmitting comprises transmitting the device kinetic signal and the device audio signal on separate audio channels of an FM stereo broadcast signal at a frequency range of 88 Mhz to 108 MHz.

38. The method as set forth in claim 34 and in which the step of generating a device-driving audio and kinetic signal complex comprise the steps of:

modulating a kinetic code to obtain a modulated kinetic signal;

generating a signal representing the modulated signal shifted in phase by 180°;

generating a signal representing the audio signal shifted in phase by 180°;

generating a first stereo television broadcast signal representing a composite of the normal television audio signal, the device audio signal and the modulated kinetic signal;

generating a separate second broadcast signal representing the device audio signal and the kinetic data signal both phase shifted by 180°; and applying the first and second broadcast signals to a television broadcast transmission system.

39. The method of regenerating control data for driving remotely located devices in real time simultaneous synchronization with interrelated audiovisual programing comprising the steps of:

sampling a kinetic device code source;

applying source programing via a musical instrument interface to a sampling keyboard;

assigning identifiable kinetic device movement to keys of the sampling keyboard; and generating a sequenced code representative of signals to drive a remotely located device in synchronization with interrelated audiovisual programing.

40. The method as set forth in claim 39 and comprising the steps of:

modulating a sequence code to obtain a modulated kinetic signal;

generating a signal representing the modulated kinetic signal shifted in phase by 180°;

generating a signal representing a device audio signal shifted in phase by 180°;

generating a first channel audio signal complex representing a composite of a normal television audio signal, the device audio signal and the modulated kinetic signal; and generating a second channel audio signal complex representing the device audio signal and the modulated kinetic data signal both phase shifted by 180°.

41. The invention as set forth in claim 40 and comprising the steps of:

applying the first and second channel audio signal complexes to first and second audio channel inputs of a recorder means along with existing programming, thereby creating enhanced programming with device audio and kinetic codes.

42. The invention as set forth in claim 40 and comprising the steps of:

broadcasting the first and second channel signals on the first and second stereo signal components of a television broadcast transmission.

* * * * *